(12) United States Patent
Bai et al.

(10) Patent No.: US 9,887,616 B2
(45) Date of Patent: Feb. 6, 2018

(54) ELECTRIC POWER CONVERSION APPARATUS WITH ACTIVE FILTER

(71) Applicant: HELLA CORPORATE CENTER USA, INC., Plymouth Township, MI (US)

(72) Inventors: Hua Bai, Flint, MI (US); Juncheng Lu, Flint, MI (US)

(73) Assignee: Hella Corporate Center USA, Inc., Plymouth Township, MI (US)

( * ) Notice: Subject to any disclaimer, the term of this patent is extended or adjusted under 35 U.S.C. 154(b) by 53 days.

(21) Appl. No.: 14/789,412

(22) Filed: Jul. 1, 2015

(65) Prior Publication Data
US 2017/0005565 A1   Jan. 5, 2017

(51) Int. Cl.
*H02M 1/12* (2006.01)
*H02M 1/42* (2007.01)
(Continued)

(52) U.S. Cl.
CPC .............. *H02M 1/12* (2013.01); *H02M 1/15* (2013.01); *H02M 1/42* (2013.01); *H02M 1/4258* (2013.01);
(Continued)

(58) Field of Classification Search
CPC .... H02M 2001/007; H02M 1/12; H02M 1/42; H02M 1/4233; H02M 1/425;
(Continued)

(56) References Cited

U.S. PATENT DOCUMENTS 6,295,216 B1 *  9/2001  Faria ...................... H02M 1/12
                                                                307/105
7,851,866 B2   12/2010  Sakurai et al.
(Continued)

FOREIGN PATENT DOCUMENTS

CN          102130572 B      12/2012
CN          102969932 B       8/2014
(Continued)

OTHER PUBLICATIONS

Krismer, et al. "Closed Form Solution for Minimum Conduction Loss Modulation of DAB Converters," in IEEE Transactions on Power Electronics, vol. 27, No. 1, pp. 174-188, Jan. 2012. doi: 10.1109/TPEL.2011.2157976. URL: http://ieeexplore.ieee.org/stamp/stamp.jsp?tp=&arnumber=5776689&isnumber=6099646.*
(Continued)

*Primary Examiner* — Fred E Finch, III
(74) *Attorney, Agent, or Firm* — Dykema Gossett PLLC

(57) ABSTRACT

A single-phase AC/DC electric power conversion apparatus includes an indirect matrix converter having an input interface to receive a first alternating current (AC) signal and an output interface to produce a second AC signal, where the first AC signal has a grid frequency. A transformer has a primary winding and an electrically isolated and magnetically coupled secondary winding. A coupling inductor is connected in series between the output interface of the indirect matrix converter and the primary winding. An H-bridge switching arrangement is connected to the secondary winding and produces an output signal having a DC component and at least one AC component. The at least one AC component has a second order harmonic of the grid frequency. An active filter reduces the second order harmonic AC component. A modular conversion apparatus for
(Continued)

three-phase power replicates the single-phase apparatus as a module for each phase and omits the active filter.

13 Claims, 10 Drawing Sheets

(51) Int. Cl.
| | |
|---|---|
| *H02M 1/15* | (2006.01) |
| *H02M 5/458* | (2006.01) |
| *H02M 7/48* | (2007.01) |
| *H02M 3/335* | (2006.01) |
| *H02M 5/22* | (2006.01) |
| *H02M 1/00* | (2006.01) |

(52) U.S. Cl.
CPC ..... *H02M 3/33507* (2013.01); *H02M 5/4585* (2013.01); *H02M 7/4807* (2013.01); *H02M 5/225* (2013.01); *H02M 2001/007* (2013.01); *H02M 2001/0058* (2013.01); *Y02B 70/12* (2013.01); *Y02B 70/1491* (2013.01)

(58) Field of Classification Search
CPC ........... H02M 1/4258; H02M 3/33507; H02M 3/33569; H02M 3/33592
See application file for complete search history.

(56) References Cited

U.S. PATENT DOCUMENTS

| | | | |
|---|---|---|---|
| 8,462,528 B2 | 6/2013 | Kajouke et al. | |
| 8,767,421 B2 | 7/2014 | Chapman | |
| 8,829,858 B2 | 9/2014 | Ransom et al. | |
| 2009/0154203 A1 | 6/2009 | Kravitz | |
| 2011/0026281 A1* | 2/2011 | Chapman | H02J 3/38 363/65 |
| 2011/0260656 A1 | 10/2011 | Kazama et al. | |
| 2012/0300502 A1* | 11/2012 | Shimada | H02M 1/4258 363/17 |
| 2013/0063981 A1* | 3/2013 | Dujic | H02M 1/4233 363/16 |
| 2013/0214729 A1 | 8/2013 | Gati et al. | |
| 2014/0063860 A1* | 3/2014 | Suzuki | H02M 1/36 363/17 |
| 2014/0119085 A1* | 5/2014 | Potharaju | H02M 7/5387 363/132 |
| 2014/0177293 A1* | 6/2014 | Eckhardt | H02M 1/12 363/37 |
| 2014/0252973 A1* | 9/2014 | Liu | H02J 1/02 315/200 R |
| 2014/0268895 A1 | 9/2014 | Keeling et al. | |
| 2014/0268903 A1 | 9/2014 | Reiter et al. | |
| 2015/0263634 A1* | 9/2015 | Fu | H02M 3/33569 363/21.02 |
| 2015/0280591 A1* | 10/2015 | Handa | H02M 1/4225 363/21.04 |
| 2015/0280593 A1* | 10/2015 | Ando | H02M 1/42 363/17 |
| 2016/0072398 A1* | 3/2016 | Deboy | H02M 3/33592 363/21.1 |
| 2016/0261205 A1* | 9/2016 | Kolar | H02M 5/458 |
| 2016/0280080 A1* | 9/2016 | Takei | B60L 11/1811 |

FOREIGN PATENT DOCUMENTS

| | | |
|---|---|---|
| DE | 102006004420 A1 | 10/2006 |
| DE | 102011077099 A1 | 1/2012 |
| DE | 102012204675 A1 | 12/2012 |
| DE | 102011086487 A1 | 5/2013 |
| DE | 102014103454 A1 | 9/2014 |
| WO | WO 2013/072217 A2 | 5/2013 |

OTHER PUBLICATIONS

International Search Report (dated Oct. 19, 2016), issued in corresponding International (PCT) Patent Application No. PCT/US2016/032375.

Yu Jin Song, et al. "A Current-Fed HF Link Direct DC/AC Converter with Active Harmonic Filter for Fuel Cell Power Systems", Industry Applications Conference, 2004. 39th IAS Annual Meeting, Conference Record of the 2004 IEEE Seattle, WA, USA Oct. 3-7, 2004, Piscataway, NJ, USA, IEEE, vol. 1, Oct. 3, 2004 (pp. 123-128).

Leung-Pong Wong, et al. "Interleaved Three-Phase Forward Converter Using Integrated Transformer", IEEE Transactions on Industrial Electronics, vol. 52, No. 5, Oct. 1, 2005 (pp. 1246-1260).

Chlebis et al., "The Comparison of Direct and Indirect Matrix Converters," Dept. of Electronics, VSB—Technical University of Ostrava, Czech Republic, Piers Proceedings, Cambridge, USA, Jul. 5-8, 2010.

Szcześniak, Chapter 2, Review of AC-AC Frequency Converters, pp. 17-86, Three-Phase AC-AC Power Converters Based on Matrix Converter Topology, Power Systems, doi: 10.1007/978-1-4896-8_2.

Bai et al., "Design of an 11 kW power factor correction and 10 kW ZVS DC/DC converter for a high-efficiency battery charger in electric vehicles," IET Power Electronics, pp. 1-9, Sep. 18, 2012. Chapter 2—Fundamentals of Matrix Converter.

Wheeler et al., "Matrix Converters: A Technology Review".

Aspalli et al., "Application of Single Phase Matrix Converter Topology to an Uninterruptible Power Supply Circuit," Int'l Journal of Research in Engineering and Technology, vol. 03, Special Issue 03, May 2014.

Bak et al., "Indirect Matrix Converter for Hybrid Electric Vehicle Application with Three-Phase and Single-Phase Outputs," Energies 2015, 8, 3849-3866, published Apr. 30, 2015.

Rossetto et al., "Control Techniques for Power Factor Correction Converters," Dept. of Electrical Engineering, Dept. of Electronics and Informatics, University of Padova, Italy.

Jauch et al., "Single-Phase Single-Stage Bidirectional Isolated ZVS AC-DC Converter with PFC," Laboratory for High Power Electronic Systems, ETH Zurich, Switzerland.

Weise et al., "A Single-Stage Dual-Active-Bridge-Based Soft Switched AC-DC Converter with Open-Loop Power Factor Correction and Other Advanced Features," IEEE Transactions on Power Electronics, vol. 29, No. 8, Aug. 2014.

Wang et al., "Study of Energy Storage Capacitor Reduction for Single Phase PWM Rectifier," Center for Power Electronics Systems, Dept. of Electrical and Computer Engineering, Virginia Polytechnic Institute and State University, Blacksburg, VA, 24060.

Jauch et al., "Modelling and ZVS Control of an Isolated Three-Phase Bidirectional AC-DC Converter," Laboratory for High Power Electronic Systems, ETH Zurich.

Everts et al., "Optimal ZVS Modulation of a Single-Phase Single-Stage Bidirectional DAB AC-DC Converters," IEEE Transactions on Power Electronics, vol. 29, No. 8, Aug. 2014.

Kasper et al., "Hyper-Efficient (98%) and Super-Compact (3.3kW/dm$^3$) Isolated AC/DC Telecom Power Supply Module based on Multi-Cell Converter Approach," Power Electronic Systems Laboratory, ETH Zurich, Switzerland, 2014.

Norrga, "Experimental Study of a Soft-Switched Isolated Bidirectional AC-DC Converter Without Auxiliary Circuit," IEEE Transactions on Power Electronics, vol. 21, No. 6, Nov. 2006.

"Rectifiers for Power Factor Correction (PFC)," Application Note, Vishay General Semiconductor, Rev. Jul. 23, 2008.

Sattar, "Power MOSFET Basics," IXYS Corporation.

Barkhordarian, "Power MOSFET Basics," International Rectifier.

* cited by examiner

ELECTRIC POWER CONVERSION APPARATUS WITH ACTIVE FILTER

CROSS-REFERENCE TO RELATED APPLICATIONS

Not applicable.

BACKGROUND a. Technical Field

The instant disclosure relates generally to power electronics systems, and more particularly to an isolated AC/DC electric power conversion apparatus.

b. Background

This background description is set forth below for the purpose of providing context only. Therefore, any aspects of this background description, to the extent that it does not otherwise qualify as prior art, is neither expressly nor impliedly admitted as prior art against the instant disclosure.

Isolated alternating current (AC)/direct current (DC) electric power converters can be used in many different applications. For example only, such an electric power converter can be used as a battery charger to charge a DC battery associated with an electric-motor powered automotive vehicle. Known isolated AC/DC electric power converters may adopt three main stages. For example, FIG. 14 shows a typical configuration, namely, a half-bridge resonance based isolated AC/DC converter 1400. The converter 1400 may include a first stage 1410, a second stage 1420, and a third stage 1430.

The first stage 1410 may be an AC/DC converter stage configured to convert grid or mains AC voltage (e.g., 50 or 60 Hz), which is shown as being provided by an AC source 1440 through an input inductor 1442, to an output DC voltage at node 1444. The first stage 1410 may use a rectifier 1446 whose switches can be controlled to implement power factor correction (PFC). The DC voltage at node 1444 is stored across a relatively large storage capacitor 1448.

The second stage 1420 may perform a DC/AC converter function that is configured to transform the rectified DC voltage to a relatively high-frequency AC voltage (e.g., hundreds of kHz). The high-frequency AC voltage in turn is applied to an electrical isolation device—shown as a transformer 1450, which has a primary winding 1452 and a secondary winding 1454. An inductor 1456 and capacitors 1458, 1460 form a resonance circuit to realize zero voltage switching (ZVS).

The third stage 1430 may perform a further AC/DC converter function, and which may include a rectifier 1462 (e.g., four diode, full wave bridge shown) configured to rectify the high-frequency AC voltage signal induced on the secondary side 1454 of the transformer 1450. The rectifier 1462 thus produces a final DC output voltage signal on node 1464. The target battery in this example is arranged to receive the final DC output voltage signal, which is shown as including a DC voltage source part 1466 and an internal battery resistance 1468.

Since the three main stages of the above-described converter 1400 are electrically connected in series, the system efficiency will ultimately be reduced. For example only, assume that stage 1410 (i.e., the PFC part) and stage 1420 (i.e., DC/AC converter part) each have a 98% efficiency, and that stage 1430 (i.e., the battery-side AC/DC converter part) and the transformer 1450 each have a 99% efficiency. Given these assumption, an overall system efficiency may be approximately 98%*98%*99%*99%=94.1%. In addition, the 3-stage converter described above incorporates a relatively large, bulky DC capacitor 1448, which can diminish power density and which can reduce a service life of the overall AC/DC electric power converter.

It would be desirable to improve the overall system efficiency, as well as increase power density and extend service life.

The foregoing discussion is intended only to illustrate the present field and should not be taken as a disavowal of claim scope.

SUMMARY

In an embodiment, an electric power conversion apparatus includes an indirect matrix converter having an input interface configured to receive a first alternating current (AC) signal and an output interface configured to produce a second AC signal. The first AC signal has a first frequency (e.g., in an embodiment, 50 Hz or 60 Hz). The conversion apparatus further includes a transformer having a primary winding and an electrically isolated and magnetically coupled secondary winding, and a coupling inductor coupled in series between the output interface of the indirect matrix converter and the primary winding of the transformer. The conversion apparatus further includes an H-bridge switching arrangement connected to the secondary winding and configured to produce an output signal on an output node. The output signal has a DC component and at least one AC component wherein the at least one AC component comprises a second harmonic (e.g., 120 Hz) of the first frequency. The conversion apparatus further includes an active filter coupled to the output node and configured to reduce the second harmonic AC component. Through the foregoing, improved conversion efficiency can be realized. In addition, the reduced number of stages eliminates the need for a bulky, DC capacitor, which can allow increased power density and as well as extended service life, among other things.

A matrix converter embodiment (with active filter) and a modular converter embodiment are also presented.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

As described in the Background, a conventional 3-stage AC/DC electric power converter suffers from reduced conversion efficiency. As will be described below, in various embodiments, a 2-stage approach is implemented, which increases electrical conversion efficiency. In addition, the embodiments eliminate the need for a bulky, DC-bus capacitor, which increases power density and extends service life.

Figure 1:
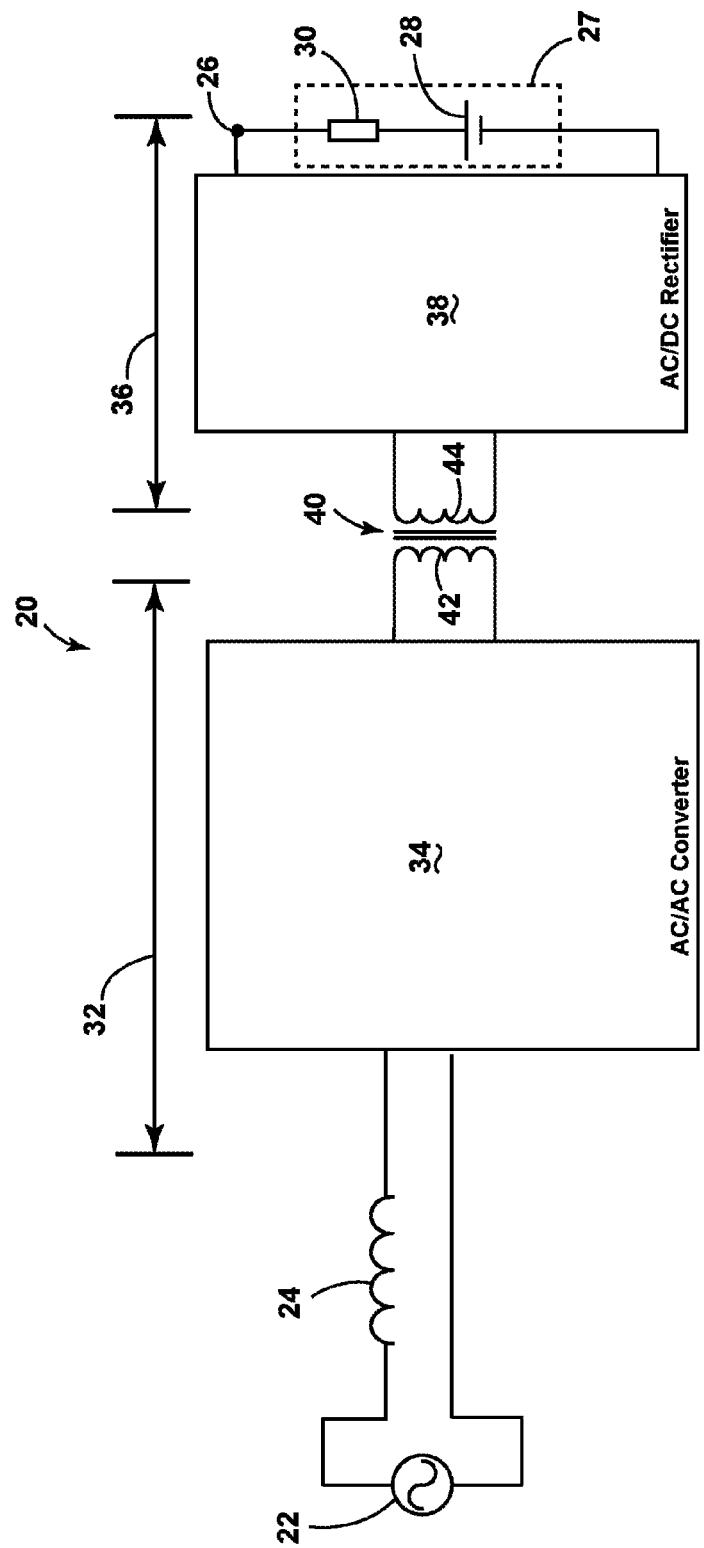
FIG. 1 is a schematic and block diagram of a reduced stage isolated AC/DC electric power converter in accordance with an embodiment.

Referring now to the drawings wherein like reference numerals are used to identify identical or similar components in the various views, FIG. 1 is simplified schematic and block diagram of an isolated AC/DC electric power conversion apparatus 20 (hereinafter "conversion apparatus"). The conversion apparatus 20 is coupled to an AC source 22 and has an input inductor 24 configured to smooth the grid-side current. The conversion apparatus 20 is further configured to output a DC voltage signal on an output node 26, which can be used to charge a re-chargeable battery 27. The battery 27 is shown to include a battery voltage source portion 28 (sometimes referred to herein as $V_b$ or $V_{BAT}$) and a battery resistance 30 (sometimes referred to herein as $R_b$). The AC source 22 (AC power source) is configured to provide an AC input current at a specified AC input voltage level. The AC source 22 may be a main AC power supply or electrical system for a building or the like provided within an overall larger AC electric power grid (hereinafter sometimes referred to as grid power, grid voltage, grid-side, etc.). The AC source 22 may be single-phase or multi-phase (see embodiment of FIG. 11). Depending on location, the AC source 22 may output 120 volts or 240 volts at 60 Hz or alternatively 110 volts or 220 volts at 50 Hz. The voltage $V_b$ of re-chargeable battery 27 may be nominally between about 200-500 VDC. In an embodiment, the conversion apparatus 20 may have an output voltage of about 360 V.

The conversion apparatus 20 includes two main stages, wherein a first stage 32 comprises an AC/AC converter 34 and wherein a second stage 36 comprises an AC/DC rectifier 38, which may further include an active filter to reduce or eliminate a double-frequency harmonic (e.g., a 120 Hz harmonic when the grid frequency is 60 Hz). The stages are electrically isolated but coupled by way of a transformer 40 having a primary winding 42 and a secondary winding 44.

Figure 14:
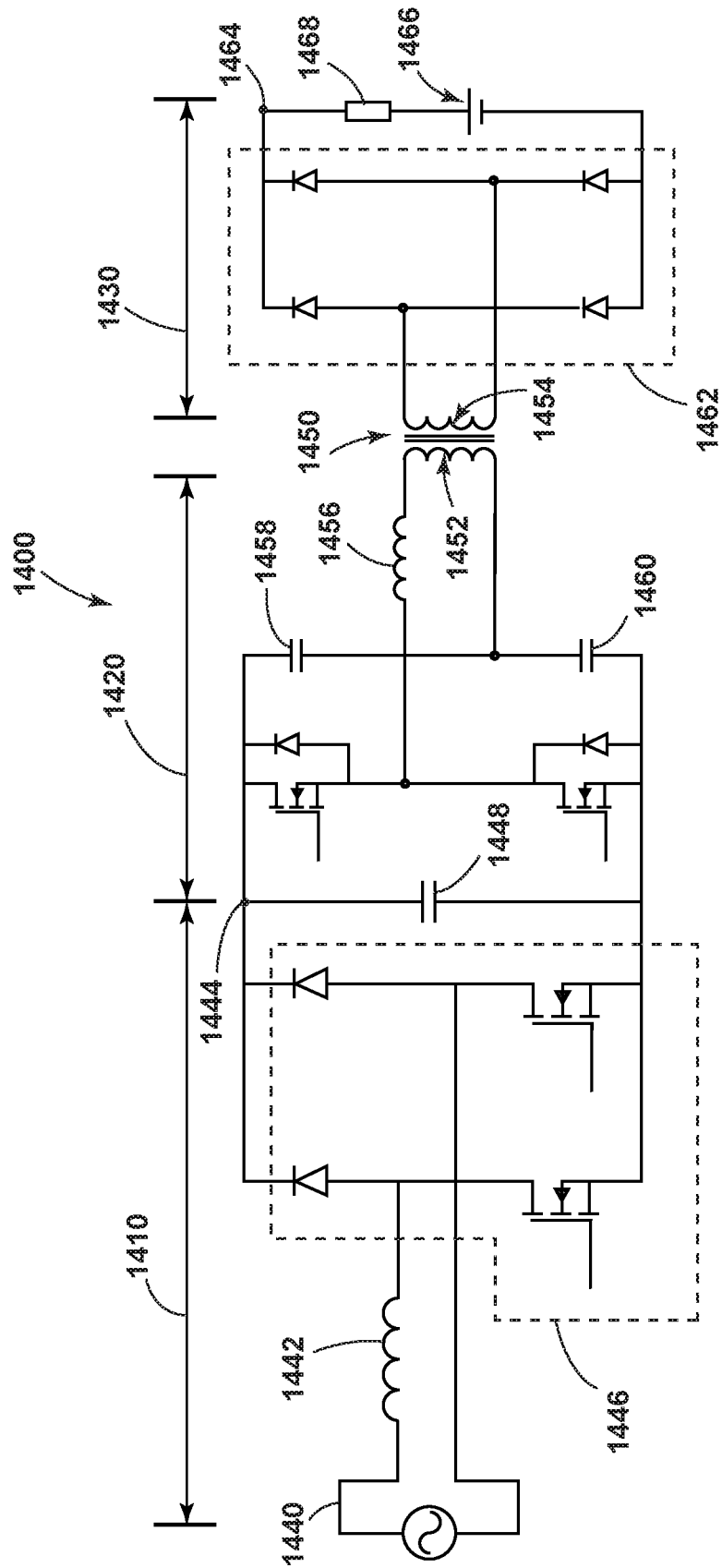
FIG. 14 shows a conventional 3-stage approach for AC/DC electric power conversion.

The first stage 32 may comprise an indirect matrix converter (MC) as the AC/AC converter 34, and may comprise conventional approaches for constructing the same as known in the art. Without loss of generality, however, in some embodiments, the converter 34 may comprise a true matrix converter. For example, such a converter can switch the sinusoidal input and output another AC waveform with minimal higher-order harmonics. Furthermore, such a matrix converter has an inherent bi-directional power flow capability and the input power factor can be fully controlled. Additionally, such a converter has minimal energy storage requirements, which eliminates the need for bulky and lifetime-limited energy-storing capacitors, such as the DC-bus energy storage capacitor 1448 in FIG. 14. Once a matrix converter is employed to convert the grid AC voltage to a high-frequency AC waveform, it merges two stages of the design of FIG. 14 (i.e., the PFC stage 1410 and the DC/AC stage 1420) into a single stage, and also eliminates the need for a DC-bus capacitor. Eliminating the DC-bus capacitor can significantly increase the power density. However, in an embodiment that uses a true matrix converter, it should be appreciated that bi-directional switches will be used to implement bi-directional power flow through the switch matrix. The use of the back-to-back connected switches (i.e., the above-mentioned bi-directional switches) in the matrix converter can increase conduction losses, increase component cost (i.e., the number of switches), as well as increase the complexity of the gate-driver design. Additionally, the output current of the AC/DC converter may have a relatively large second-order harmonic, which is generally not favorable for the battery and would require filtering. Accordingly, an indirect matrix converter-based embodiment will be described in connection with FIG. 2.

Figure 2:
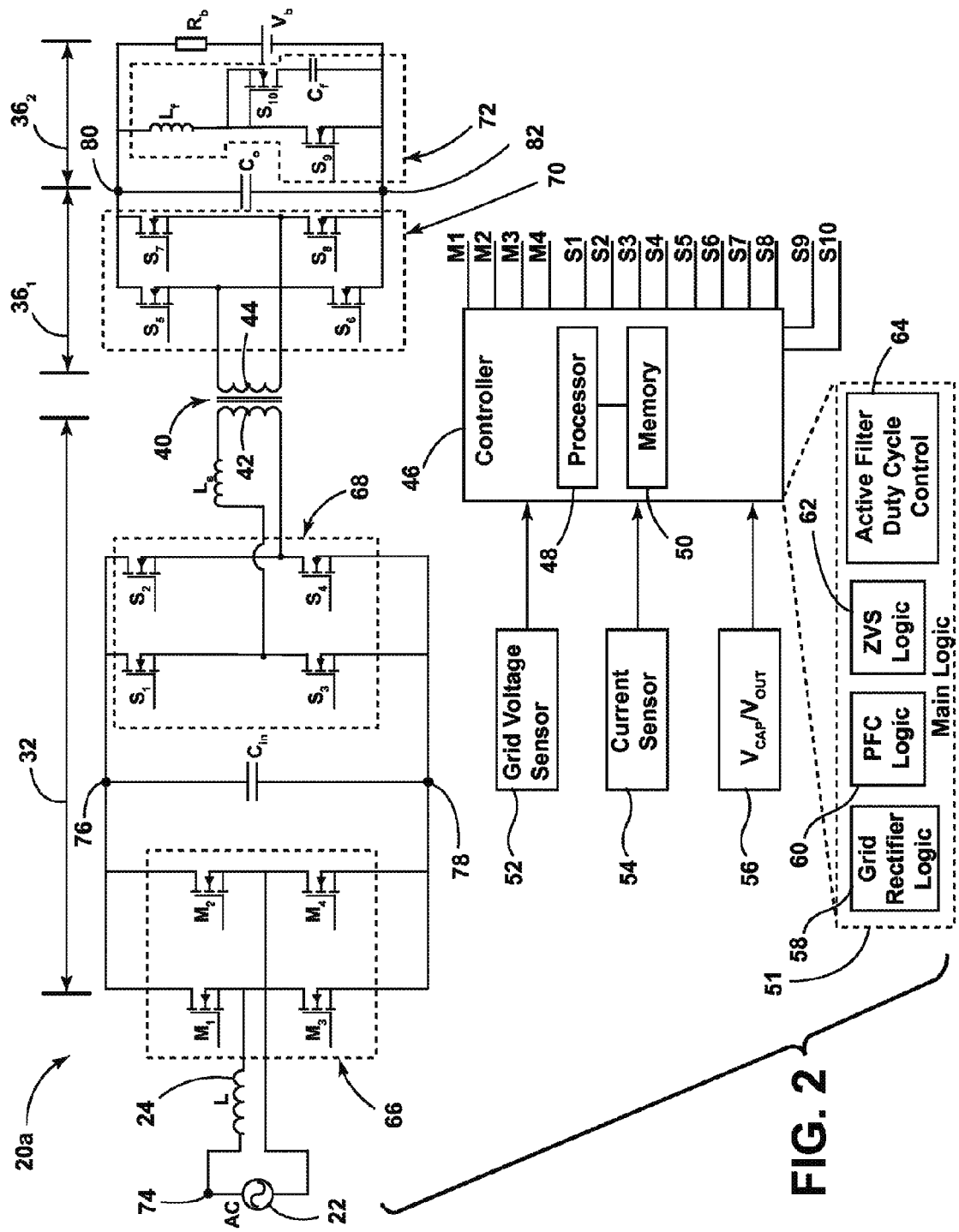
FIG. 2 is diagrammatic schematic and block diagram of an isolated AC/DC electric power converter with an active filter according to another embodiment.

FIG. 2 shows another embodiment of isolated AC/DC electric power conversion apparatus, designated 20a, that features an indirect matrix converter as well as an active output filter. Conversion apparatus 20a includes two main stages, namely, a first stage 32 that includes an AC/AC converter in the form of an indirect matrix converter and a second stage 36 that includes an AC/DC part $36_1$ and an active filter part $36_2$. As noted above, the 2-stage configuration can result in an increased electrical efficiency as compared to conventional 3-stage configurations. The indirect matrix converter obviates the need for back-to-back (bi-directional) switches and the resulting numerosity of switches, complexity of gate driver design, etc. The following will initially address the component description followed by an operational description.

On the input (grid) side, FIG. 2 shows AC (grid) source 22, which may be a single phase, 60 Hz, 120 volt alternating current (AC) voltage signal or alternately a single phase 50 Hz AC signal, although a 3-phase embodiment will be described below in connection with FIG. 11. On the output (battery) side, FIG. 2 shows a rechargeable battery $V_b$ with battery resistance $R_b$.

The first stage 32 of conversion apparatus 20a includes an input inductor 24 (sometime referred to as "L"), an indirect matrix converter, a coupling inductor $L_s$, and transformer 40, which includes primary windings 42 and secondary windings 44.

The input inductor 24 is electrically coupled in series with AC source 22 and is configured to smooth the grid-side current in respect of AC source 22. The size of inductor 24 will depend on the degree of smoothing and the switching frequency. In an embodiment, inductor 24 may be about 10 micro-henry (μH).

The indirect matrix converter is configured for AC/AC conversion and includes an input interface configured to receive a first AC signal from AC source 22 and an output interface configured to produce a second AC signal. As shown in FIG. 2, the input interface of the indirect matrix converter is coupled to both side of the AC source through inductor 24. The output interface of the indirect matrix converter is coupled to both ends of the primary winding 42 through the coupling inductor $L_s$. In an embodiment, the indirect matrix converter includes a full bridge rectifier 66 (AC/DC converter), a filter capacitor designated $C_{in}$, and a DC/AC full bridge converter 68.

Full bridge rectifier 66 constitutes a means for rectifying the first alternating current (AC) input signal at node 74 (i.e., at a first, grid frequency, for example, 60 Hz) and producing a first rectified output signal at node 76. The first rectified signal includes a first direct current (DC) component. Rectifier 66 may include four semiconductor switches, designated $M_1$, $M_2$, $M_3$, $M_4$, arranged in a full bridge configuration and operating at the grid frequency. The switches $M_1$, $M_2$, $M_3$, $M_4$ may comprise conventional semiconductor switches known in the art, such as MOSFET or IGBT devices. In an embodiment, the switches $M_1$, $M_2$, $M_3$, $M_4$ may comprise an N-Channel power MOSFET provided under the trade designation and/or part number STY139N65M5 from STMicroelectronics, Coppell, Tex., USA.

Capacitor $C_{in}$ is connected across the output of rectifier 66, between node 76 and a ground node 78. Capacitor $C_{in}$ is configured in size to filter high-frequency harmonics from the rectified signal at node 76 (e.g., relatively small: ~uF level). It should be understood that $C_{in}$ is not used for energy storage, but is rather used for filtering purposes, and is thus not a large, bulky DC-bus capacitor as is typical for conventional 3-stage chargers where the DC-bus capacitor may be on the order of millifarads (~mF). This reduced size in $C_{in}$ can increase the power density and extend the service life of the conversion apparatus 20a.

The DC/AC converter 68 is electrically connected to the output of rectifier 66 (i.e., connected across nodes 76, 78). The DC/AC converter 68 is configured to convert the first DC (rectified) signal on node 76 into an AC signal. As illustrated, DC/AC converter 68 may comprise four semiconductor switches, designated $S_1$, $S_2$, $S_3$, $S_4$, and arranged in a full bridge configuration operating at a second frequency, namely, a switching frequency $f_s$. The second, switching frequency $f_s$ is much higher than the first, grid frequency. In an embodiment, the second, switching frequency may be in a range of between about 135 kHz to 500 kHz, while the first, grid frequency may be 60 Hz (or 50 Hz). The semiconductor switches $S_1$, $S_2$, $S_3$, $S_4$ may comprise commercially available components, for example, a GaN High Electron Mobility Transistor (HEMT) device, such as an enhancement mode GaN transistor provided under the trade designation and/or part number GS66516T from GaN Systems Corp., Ann Arbor, Mich., USA.

Inductor $L_s$ is electrically connected in series between the DC/AC converter 68 and primary winding 42.

Transformer 40 constitutes an electrical isolation device and includes a primary winding 42 and an electrically isolated and magnetically coupled secondary winding 44. As known, transformer 40 is characterized by a turn ratio between the secondary winding and the primary winding.

The second stage 36 of conversion apparatus 20a includes an AC/DC converter 70, an output capacitor designated $C_o$, and an active output filter 72.

AC/DC converter 70 is electrically connected to the second winding 44 of transformer 40 and is configured to convert the AC signal induced on the secondary winding 44 to a second rectified but unfiltered output signal on output node 80. As will be described in detail below, the output signal on output node 80 has a DC component and at least one AC component wherein the at least one AC component is second harmonic of the grid frequency.

In the illustrated embodiment, the AC/DC converter 70 may comprise four semiconductor switches, designated switches $S_5$, $S_6$, $S_7$, $S_8$, arranged in an active H-bridge (full) switching arrangement 70. In an embodiment, H-bridge switching arrangement 70 is controlled to operate at the above-mentioned switching frequency $f_s$ (i.e., switches $S_1$~$S_8$ are controlled to operate at the same switching frequency $f_s$). The semiconductor switches $S_5$, $S_6$, $S_7$, $S_8$, may comprise commercially available components, for example, a GaN High Electron Mobility Transistor (HEMT) device, such as an enhancement mode GaN transistor provided under the trade designation and/or part number GS66516T from GaN Systems Corp., Ann Arbor, Mich., USA.

Output capacitor $C_o$ is connected across the output of H-bridge 70 between node 80 and a ground node 82 and is configured in size to filter high-frequency harmonics from the output signal at node 80 (e.g., relatively small: ~uF level). In an embodiment, capacitor $C_o$ may be about 100 μF.

Active output filter 72 is electrically connected to output node 80 and is configured to reduce at least a $2^{nd}$ order harmonic component in the output signal (i.e., $2^{nd}$ order harmonic relative to the grid frequency). In the illustrated embodiment, active filter 72 may comprise two semiconductor switches, designated switches $S_9$, $S_{10}$, arranged in a boost type filter arrangement with inductor $L_f$ and capacitor $C_f$. Where the grid frequency is 60 Hz, active filter 72 is configured to choke or otherwise reduce the magnitude of a 120 Hz harmonic component, in an embodiment.

Conversion apparatus 20a further includes an electronic control unit 46 (hereinafter "controller" 46) configured to implement a desired control strategy for the operation of conversion apparatus 20a. Controller 46 includes a processor 48 and a memory 50. Processor 48 may include processing capabilities as well as an input/output (I/O) interface through which processor 48 may receive a plurality of input signals and generate a plurality of output signals (e.g., gate drive signals for switches $M_1$~$M_4$, $S_1$~$S_8$, and $S_9$~$S_{10}$). Memory 50 is provided for storage of data and instructions or code (i.e., software) for processor 48. Memory 50 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM). Although not shown in FIG. 2, conversion apparatus 20a may also include a driver circuit to interface between the outputs of controller 46 and the gate terminals of the semiconductor switches. In an embodiment, such gate drive devices may comprise commercially available components, such as a commercially available chip known in the art, for example, a gate drive chip available under part number IXD_614 from IXYS Corporation, Milpitas, Calif., USA.

Memory 50 stores executable code in the form of main control logic 51, which is configured to control the operation of conversion apparatus 20a in accordance with a desired control strategy. Main control logic 51, when executed by processor 48, is configured to generate, in response to one or more input signals, the various gate drive signals for the switches $M_1$~$M_4$, $S_1$~$S_8$, and $S_9$~$S_{10}$. Main control logic 51 may include programmed logic blocks to implement specific functions, including without limitation rectifier logic 58, power factor correction (PFC) logic 60, zero voltage switching (ZVS) logic 62, and active filter duty cycle control logic 64.

The grid rectifier logic 58 is configured to generate the gate drive signals for switches $M_1$~$M_4$ of rectifier 66. To accomplish this, conversion apparatus 20a may include a grid voltage sensor 52 (shown in block form) configured to output a signal indicative of a grid voltage, including a polarity (i.e., positive or negative). The voltage sensor 52 may be disposed on the grid side (i.e., electrically connected to AC source 22) to monitor the grid voltage. In an embodiment, grid voltage sensor 52 may comprise conventional components known in the art.

Figure 3:
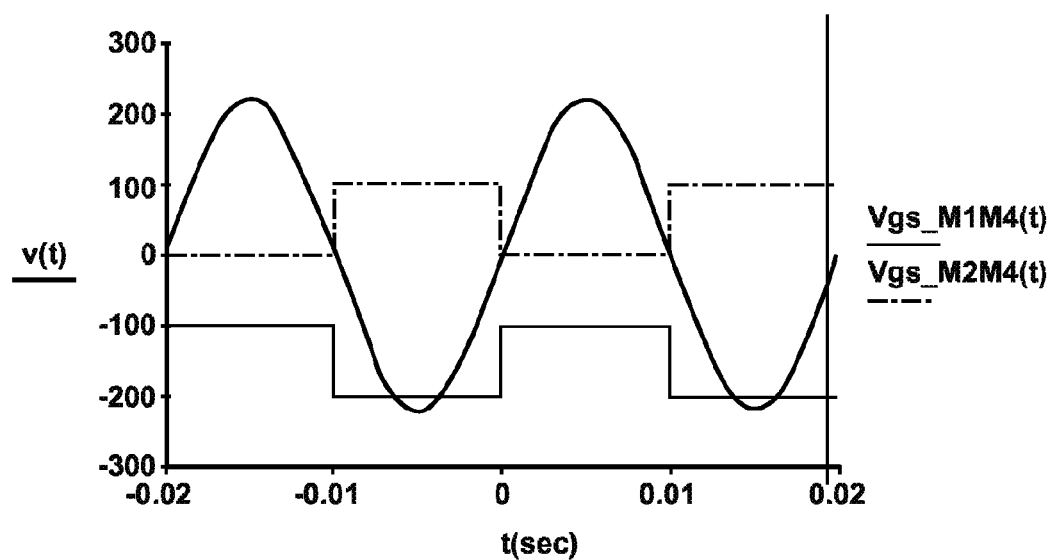
FIG. 3 shows simplified, timing diagrams of a first set of switch control signals associated with a full bridge based AC/DC rectifier of FIG. 2.

FIG. 3 shows timing diagrams of the gate drive signals (i.e., switch control signals) produced by the grid rectifier logic 58 of controller 46. The $M_1$~$M_4$ based H-bridge rectifier 66 will rectify the grid AC voltage into a DC voltage. The switching frequency of $M_1$~$M_4$ is the same as the grid voltage (e.g., 50~60 Hz). Note, that $M_1$~$M_4$ are controlled by the detecting the polarity of the grid voltage. Thus, when the grid voltage is positive, $M_1$ and $M_4$ are turned on (i.e., the $V_{GS}$ of $M_1$ and $M_4$ is high). When the grid voltage is negative, $M_2$ and $M_3$ are turned on. The gate drive signals for switches $M_1$ and $M_4$ operate in unison while switches $M_2$ and $M_3$ operate in unison. Additionally, the combination of $M_1M_4$ are complementary to the combination of $M_2M_3$. In sum, the switches $M_1$~$M_4$ are all active switches working at the grid frequency, e.g., 60 Hz, as per the zero transitions of the grid voltage sensor 52 output. From an efficiency point of view, it should be appreciated that the conduction loss in the rectifier 66 will be dominant as compared to the switching loss, which can be effectively ignored.

Referring again to FIG. 2, power factor correction (PFC) control logic 60 is configured, in general, to manage the operation (i.e., conduction or non-conduction) of the switches $S_1$~$S_8$ in such a way so as to control the instantaneous current from AC source 22 so as to be in phase with the instantaneous voltage of the AC source 22. To achieve a unity or near unity power factor (i.e., a condition where the grid side voltage and current are in phase), conversion apparatus 20a includes a grid current sensor 54. In an embodiment, the current sensor 54 is configured to determine the current through inductor 24, and provide a signal to controller 46 that indicates the level of electrical current being drawn from AC source 22. This signal is thus a grid current indicative signal. In an embodiment, controller 46 through PFC logic 60 implements power factor correction by controlling the gate drive signals for switches $S_1$~$S_8$. This will be described in greater detail below. Grid current sensor 54 may comprise conventional components known in the art.

Zero voltage switching (ZVS) logic 62 is configured, in general, to manage the switches $S_1$~$S_8$ in such a way so that they are turned on and off preferably with a zero or a near zero voltage. Generally, in order to maintain zero voltage switching for switch turn-on, before the turning on action, current should reverse flow from the source to drain, which makes the switch voltage drop to zero. Thus, during the switch turn on, the switch only undertakes the current change with a voltage then-prevailing across the drain to source of the switch always being close to be zero, which in turn eliminates the turn-on loss to thereby reach the ZVS turn on. For more information, reference may be made to co-pending U.S. application Ser. No. 14/744,998, filed 19 Jun. 2015, now pending (the '998 application, entitled "GATE DRIVE CIRCUIT"), which '998 application is hereby incorporated by reference as though fully set forth herein.

Figure 4:
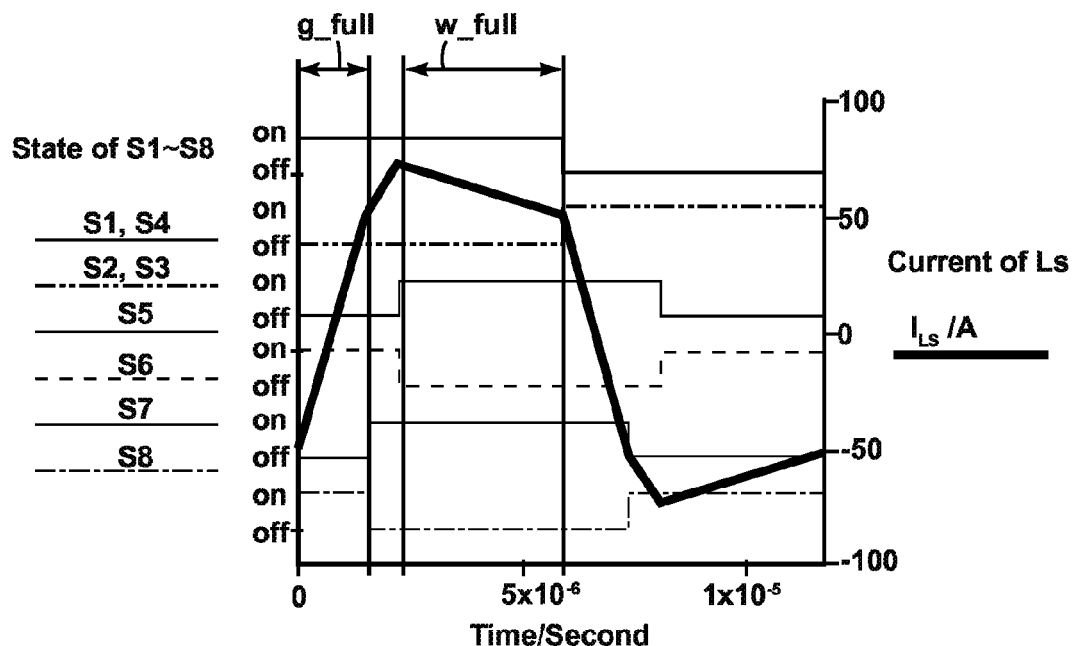
FIG. 4 shows simplified, timing diagrams of a second set of switch control signals to control the operation of the grid-side DC/AC converter and the battery-side AC/DC rectifier of the embodiment of FIG. 2.

FIG. 4 shows timing diagrams of the gate drive signals (i.e., a second set of switch control signals) to control the operation of switches $S_1$~$S8$, in a single switching frequency embodiment. In the illustrated embodiment, $S_1$~$S_8$ will be operated at the same switching frequency $f_s$ with 50% duty cycle. To achieve the high system power density, the switching frequency $f_s$ should be as high as possible. The gate drive signals for $S_1$ and $S_2$, $S_3$ and $S_4$, $S_5$ and $S_6$, and $S_7$ and $S_8$, are complementary. The main control logic 51 is configured to introduce a phase shift between the gate drive signals for $S_5$ and $S_7$. Plural factors, including the switching frequency $f_s$ and the determined phase shift between $S_5$ and $S_7$, together determine the power transferred from the primary side of transformer 40 to the secondary side. In another words, the above-mentioned factors provide two (2) degrees of freedom to control the transferred power. Meanwhile, in order to achieve ZVS, the $S_5$-to-$S_7$ phase shift must fall into a certain range, which restricts the switching frequency $f_s$ to a certain value as well. This control will be described in greater detail below. In FIG. 4, the current through inductor Ls is also shown, in timed relationship to the states of switches $S_1$~$S_8$.

Figure 5:
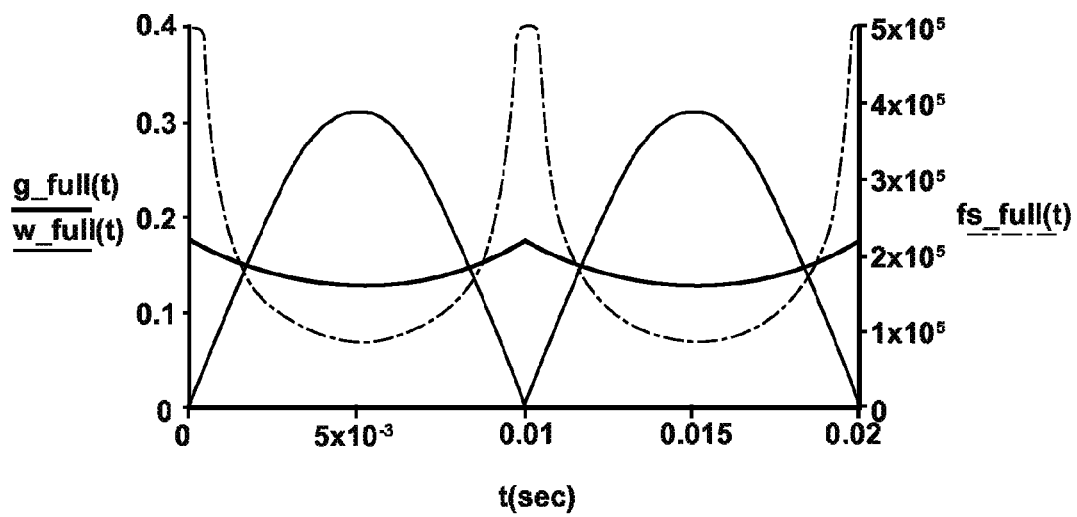
FIG. 5 is a timing diagram of parameters determining switch timing in FIG. 4.

The main control logic 51, in compliance with PFC logic 60 and ZVS logic 62, determine at least two parameters, designated g_full and w_full in FIGS. 4-5. The g_full parameter corresponds to a time delay between $S_2$ and $S_8$ falling edges, while the w_full parameter corresponds to a time delay between $S_1$ and $S_6$ falling edges. The $S_5$-to-$S_7$ phase shift is defined in between g_full and w_full, as graphically shown in FIG. 4.

FIG. 5 is a timing diagram showing waveforms of the above-described g_full and w_full parameters, which are the two parameters used by controller 46 to determine the phase shift between $S_5$ and $S_7$. The parameter fs_full corresponds to the switching frequency $f_s$.

Main Control Logic 51.

In an embodiment, the main control logic 51 is executed by controller 46 wherein the functions of rectifier logic 58, PFC logic 60, and ZVS logic 62 are realized concurrently. In this regard, the w_full parameter may be determined by controller 46 in accordance with eqn. (1):

$$w\_full(t) := \frac{0.5 \cdot (|v(t)| - 2 \cdot g\_full(t) \cdot |v(t)|)}{V2 \cdot n\_full} \quad \text{Equation (1)}$$

where V(t) is measured voltage on the grid side of converter 20a (i.e., input node 74—FIG. 2), V2 is the measured output voltage of the converter at node 80, and n_full is turn ratio of the transformer 40 (i.e., $N_s/N_p$ where $N_s$ is the number of secondary turns and $N_p$ is the number of primary turns). The parameter g_full in Equation (1) is determined by system designer to achieve ZVS switching. In an embodiment, g_full=0.5 (gmin+gmax), where the functions of gmin and gmax are as set forth in Equations (2) and (3) below:

$$gmin\_full(t) := \frac{2Is\_full \cdot Lf \cdot fsa}{|v(t)| + V2 \cdot n\_full} \quad \text{Equation (2)}$$

$$gmax\_full(t) := \frac{V2^2 \cdot n\_full^2 - V2 \cdot n\_full \cdot |v(t)| + 2 \cdot (|v(t)|)^2}{4 \cdot V2^2 \cdot n\_full^2 + 4 \cdot (|v(t)|)^2} \quad \text{Equation (3)}$$

where gmin is determined by the minimum reactive energy to achieve zero voltage switching (ZVS) and Is_full is the minimum current to achieve ZVS, Lf is the series inductance on primary side (this is represented as $L_s$ in FIG. 2), and fsa is the system maximum switching frequency. The variables V(t) and V2 is defined above.

In addition, the parameter gmax is determined by the monotonous zone of controlled variable (instantaneous transferred power vs. g_full).

In operation, controller 46 varies the switching frequency $f_s$ in real time during operation. In other words, controller 46 executing main control logic 51 (and subordinate logic modules noted above) varies the operating switching frequency of S1~S8 during real time operation. First, the switching frequency of switches S1~S8 (i.e., fs_full or sometimes referred to as $f_s$ herein) and the parameter g_full together determine the instantaneous power. In addition, the parameter g_full is defined by g_full=0.5 (gmin+gmax) as noted above. Thus, the switching frequency fs_full is determined by the instantaneous power and g_full, as in Equation (4) below:

$$fs\_full(t) := \left[ 2 \cdot |v(t)| \cdot \frac{(1 - 2 \cdot w\_full(t)) \cdot |v(t)| + 2 \cdot V2 \cdot n\_full \cdot g\_full(t)}{4 \cdot Lf \cdot Ptrans\_full(t)} \cdot (0.5 - g\_full(t)), fsa \right] \quad \text{Equation (4)}$$

In addition, it should be understood that the ZVS implementation may restrict switching frequency. In this regard, the g_full and fs_full parameters together determine transferred power. The g_full parameter is determined by ZVS, and the switching frequency is determined by the required transferred power and the g_full parameter (or ZVS). Additionally, power factor correction (PFC) requires that the transferred power from the primary side to the secondary side of the transformer to be in-phase with the input AC voltage, which is determined together by the g_full and the fs_full parameters as described above.

Referring again to FIG. 2, active filter duty cycle logic 64 is configured to control the duty cycle of the switches $S_9$~$S_{10}$. The active filter duty cycle logic 64 is responsive to an output signal from block 56, which output signal corresponds to a ratio of $V_{cap}/V_{out}$ and produces gate drive signals for switches $S_9$~$S_{10}$ that operate the active filter 72. It should be understood that the for the active filter 72, the switching frequency of switches $S_9$~$S_{10}$ can be different from the switching frequency $f_s$ of switches $S_1$~$S_8$.

Figure 6:
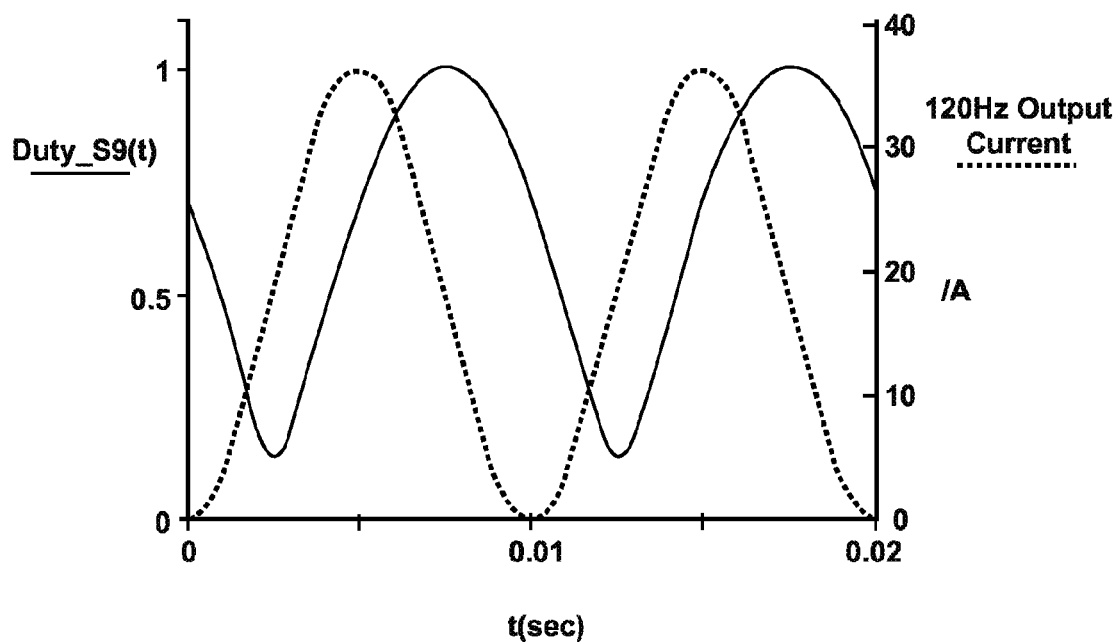
FIG. 6 is a simplified timing diagram showing a duty cycle associated with an active output filter of the embodiment of FIG. 2.

FIG. 6 shows a timing diagram of a duty cycle for $S_9$. In an embodiment, in order to filter a $2^{nd}$ order harmonic (e.g., a 120 Hz current ripple relative to a 60 Hz grid frequency) that exists in the output at node 80, active filter 72 is operative to fill the power gap between the transferred power and the target power (i.e., a constant value) by controlling the duty cycle of $S_9$ and $S_{10}$. In other words, during times where the output current through node 80 would otherwise be larger than is needed for the target power, power is stored in the active filter in the energy storage elements, while during the times where the output current on node 80 would otherwise be smaller, the stored energy is returned to the output.

In an embodiment, $S_9$ and $S_{10}$ are complementary. As described above, the duty cycle of $S_9$ is controlled by the $V_{cap}/V_{out}$, which is shown. Note that $V_{cap}$ is the voltage across the filter capacitor $C_f$ and $V_{out}$ is the output voltage taken at node 80 across output capacitor $C_o$. Note that the duty cycle of the switch $S_9$ is aligned with (but offset from) current before the active filter 72, which can be seen to have a 90° time delay. In a constructed embodiment, the use of active filter 72 is very effective at reducing the above-mentioned $2^{nd}$ order harmonic (current ripple), as shown in FIGS. 7-8.

Figure 7:
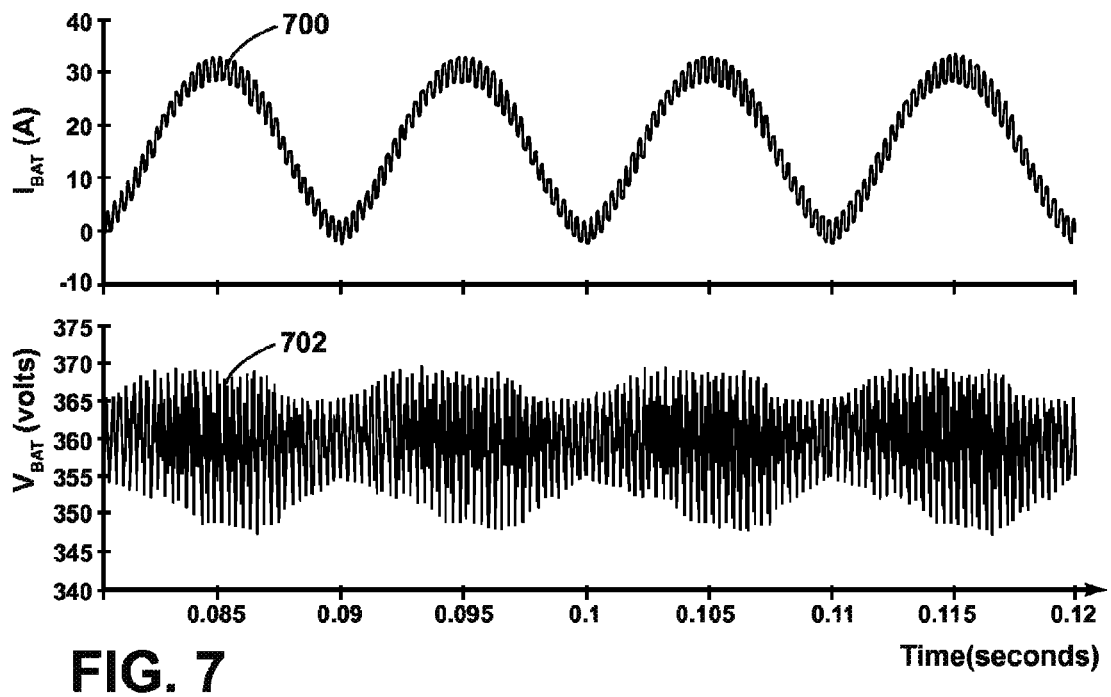
FIG. 7 shows simplified current and voltage timing diagrams of an output of an AC/DC power converter without an active output filter.
Figure 8:
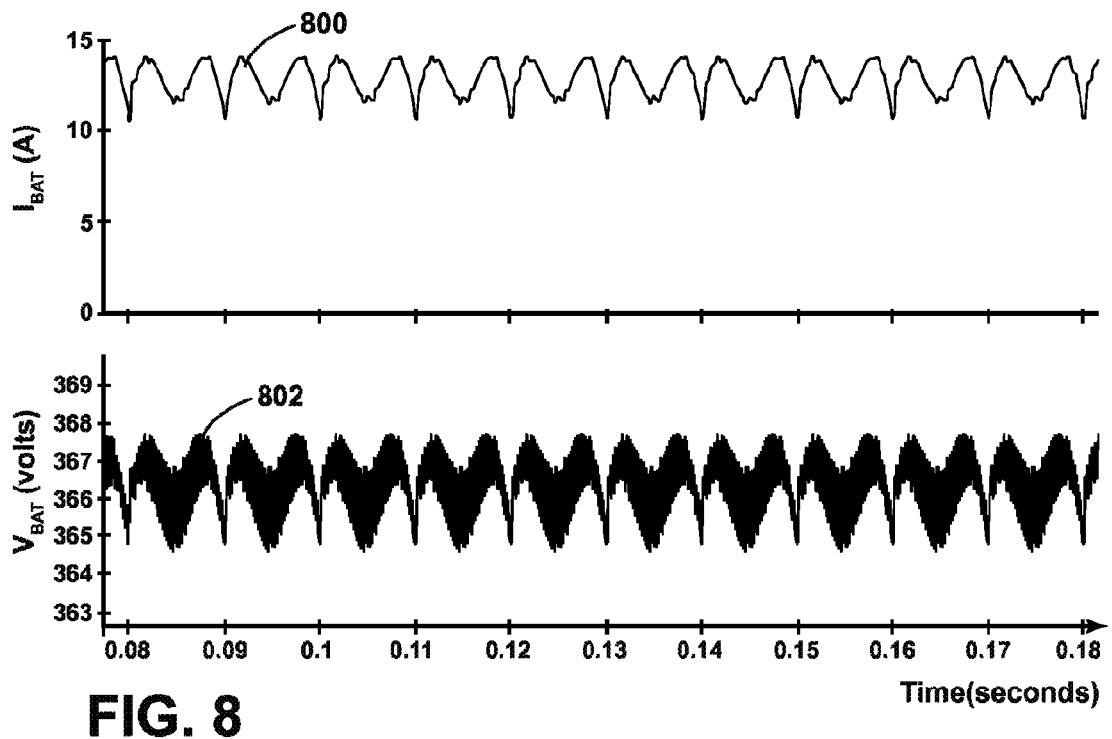
FIG. 8 shows simplified current and voltage timing diagrams of an output of the AC/DC power converter embodiment of FIG. 2 with active filtering.

FIGS. 7-8 show current and voltage timing diagrams of an output of an AC/DC electric power converter (i) without the benefit of active output filter 72 and (ii) with the beneficial filtering of active filter 72. For example, the current in FIG. 7 exhibits a roughly thirty (30) ampere peak-to-peak ripple, as compared to a roughly four (4) ampere or so level of ripple in FIG. 8. Likewise, a reduction in the voltage ripple can be seen in FIG. 8 as compared to FIG. 7.

It should be understood that variations are possible. While the active filter 72 of conversion apparatus 20a is used in connection with an indirect matrix converter, the instant disclosure is not so limited. In particular, such active filtering could also be applied to a true matrix converter (e.g., containing bi-directional or back-to-back switch arrangements) since nearly all AC/AC one-stage converters—such as a the true matrix converter—will have double-frequency harmonics, thereby benefiting from the active filter to smooth out such harmonics.

Figure 10:
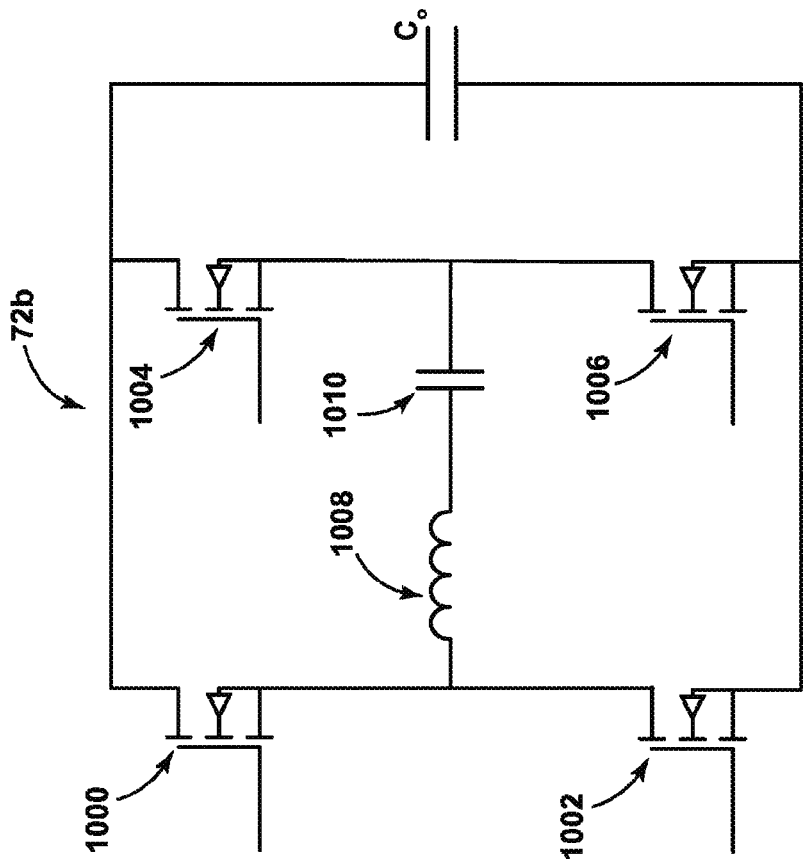
FIGS. 9-10 are simplified schematic diagrams of alternate embodiments for the active output filter of FIG. 2.
Figure 9:
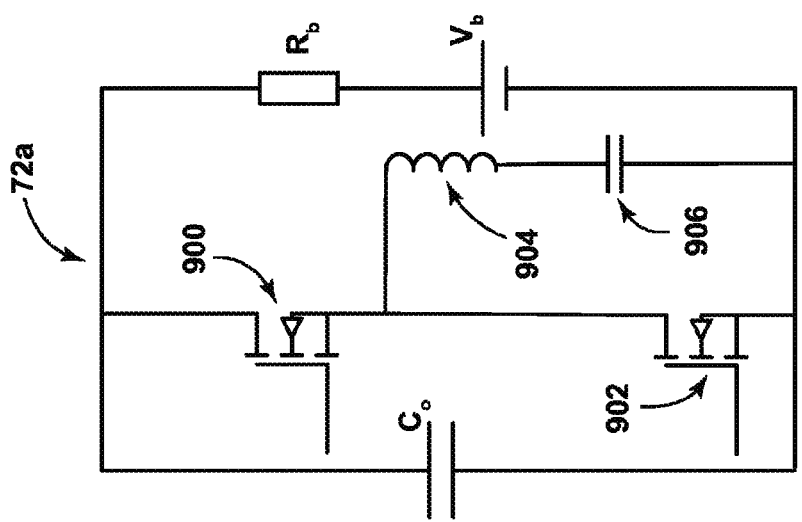

FIGS. 9-10 are schematic diagrams of alternate active filter embodiments that could be used instead of active filter 72 in FIG. 2, designated 72a and 72b, respectively. Active filter 72a comprises a buck type active filter and active filter 72b comprises an H-bridge type active filter.

In FIG. 9, buck type active filter 72a comprises a semiconductor switch 900 (i.e., corresponding to switch $S_9$ in filter 72), a semiconductor switch 902 (i.e., corresponding to switch $S_{10}$ in filter 72), a filter inductor 904 and a filter capacitor 906. These components are shown in relation to output capacitor Co (also shown in FIG. 2) and battery 27 comprising battery source 28 ($V_b$) and battery resistance 30 ($R_b$).

In an embodiment, the state of switches 900 and 902 are complementary. The duty cycle of the switch is controlled by the $V_{out}$. Note that $V_{cap}$ is the voltage across the filter capacitor 906 and $V_{out}$ is the output voltage across output capacitor $C_o$. When $V_{out}$ is larger than the target value, the duty cycle of the switch 900 will increase to store the excessive energy. Otherwise, the duty cycle of the switch 900 will decrease.

In FIG. 10, H-bridge type active filter 72b comprises a semiconductor switch 1000 (i.e., corresponding to switch $S_9$ in filter 72), a semiconductor switch 1002 (i.e., corresponding to switch $S_{10}$ in filter 72), additional semiconductor switches 1004, 1006, a filter inductor 1008 and a filter capacitor 1010. These components are shown in relation to output capacitor $C_o$ (also shown in FIG. 2; battery source 28 ($V_b$) and battery resistance 30 ($R_b$) are omitted for clarity). The four switches 1000, 1002, 1004, 1006 are arranged in an H-bridge as known in the art.

In an embodiment, switches 1000 and 1002, 1004 and 1006 are complementary. The duty cycle of the switch is controlled by the $V_{out}$. Note that $V_{cap}$ is the voltage across the filter capacitor 1010 and $V_{out}$ is the output voltage across output capacitor $C_o$. When $V_{out}$ is larger than the target value, the duty cycle of the switches 1000 and 1006 will increase to store the excessive energy in the filter capacitor 1010. Otherwise, the duty cycle will decrease.

Figure 11:
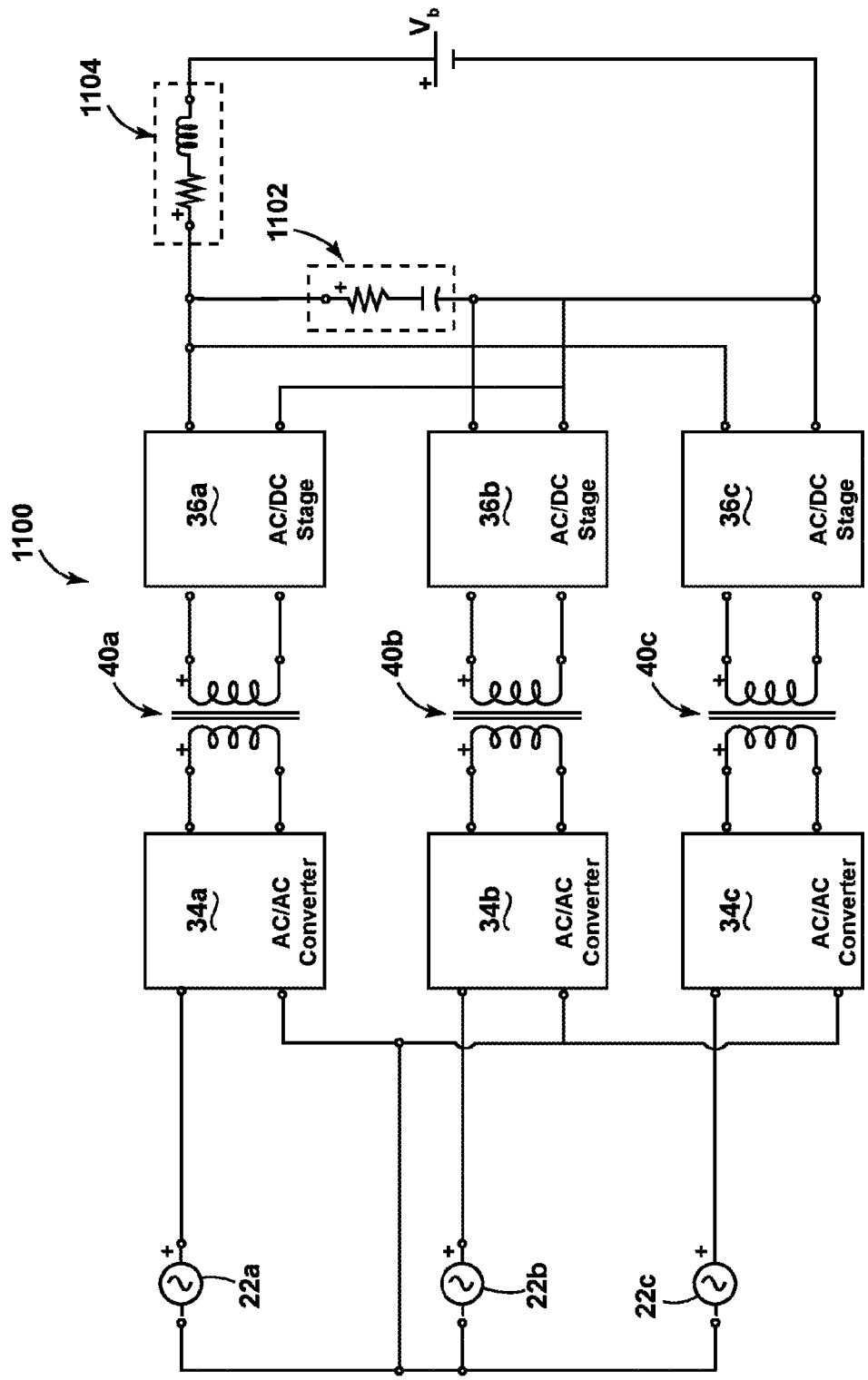
FIG. 11 is a simplified schematic and block diagram of a modular multi-phase AC/DC electric power converter embodiment.

FIG. 11 is a schematic and block diagram of a modular multi-phase AC/DC electric power conversion apparatus, designated AC/DC conversion apparatus 1100. The above-described topology as applied to a single phase AC power source 22 (i.e., conversion apparatus 20a) can be applied in a parallel fashion for higher power applications and/or applied for use in a three-phase charger. When used in three-phase applications, the active filter 72 described above can be eliminated, thereby increasing system efficiency. Omitting the active filter 72 is possible because the output current of each phase has a natural 120° difference with respect to each of the other phases, and accordingly when added together, all the AC components as combined will tend to cancel each other out (i.e., the undesirable ripple can be neutralized).

With reference to FIG. 11, a three-phase AC source is shown, for example, as individual sources 22a, 22b, 22c respectively providing Ac power with respective phases designated phase a, phase b, and phase c. The blocks 34, 36 and transformer 40 in FIGS. 1 and 2 can be replicated for each phase, as shown. An output capacitance (and series resistance) is shown as block 1102, and an output inductor (and series resistance) is shown as block 1104. The battery voltage $V_b$ is also shown for frame of reference.

Figure 12:
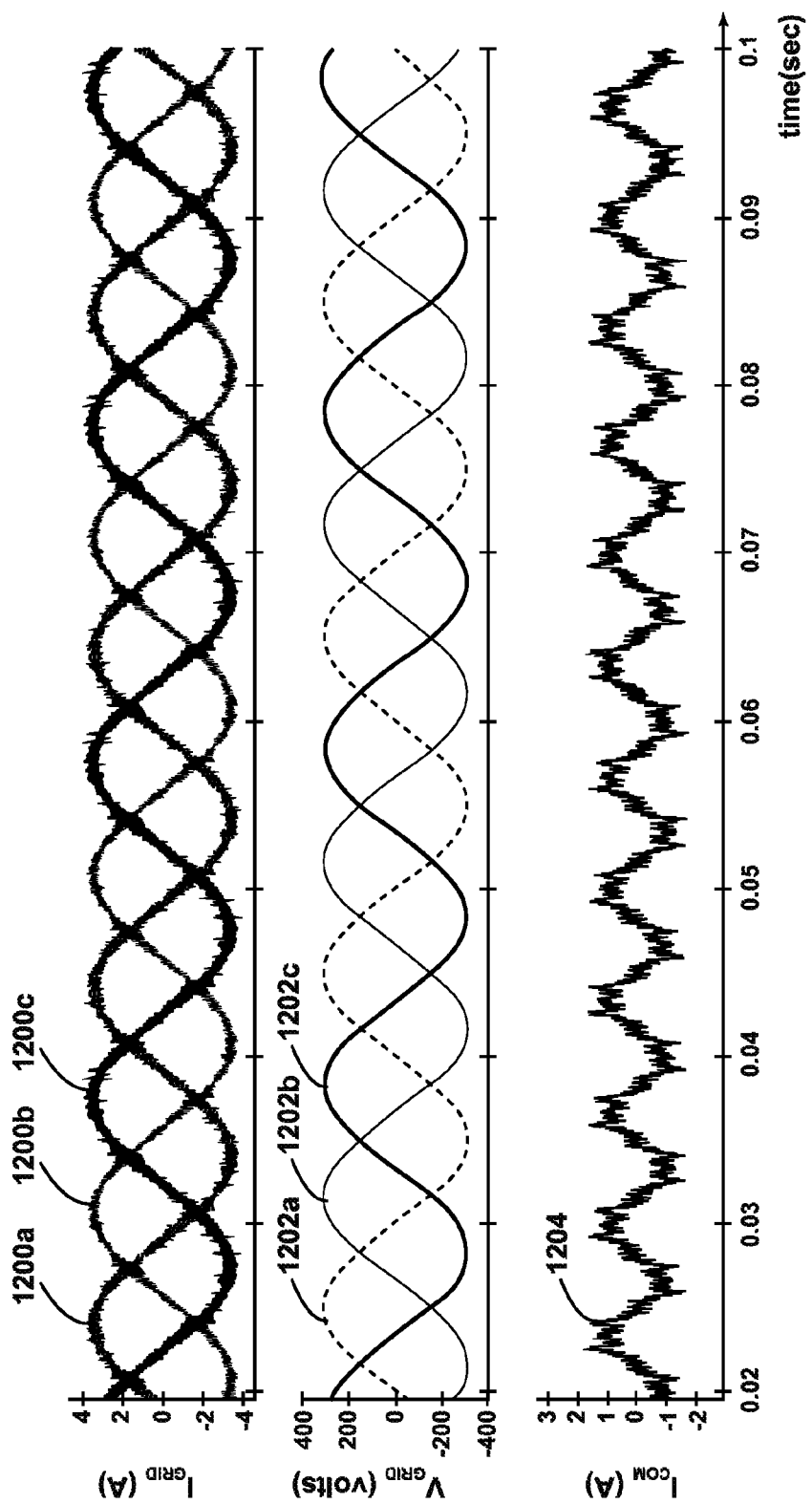
FIG. 12 shows grid side current (per phase), voltage, and common mode current associated with the operation of the embodiment of FIG. 11.

FIG. 12 shows grid side current (per phase), voltage, and common mode current associated with the operation of the multi-phase conversion apparatus 1100 of FIG. 11. In the topmost trace, grid current signals 1200a, 1200b, and 1200c are shown corresponding to phases a, b, and c. The middle trace shows voltage signals 1202a, 1202b, and 1202c corresponding to phases a, b, and c. The bottommost trace shows common mode current signal 1204.

Figure 13:
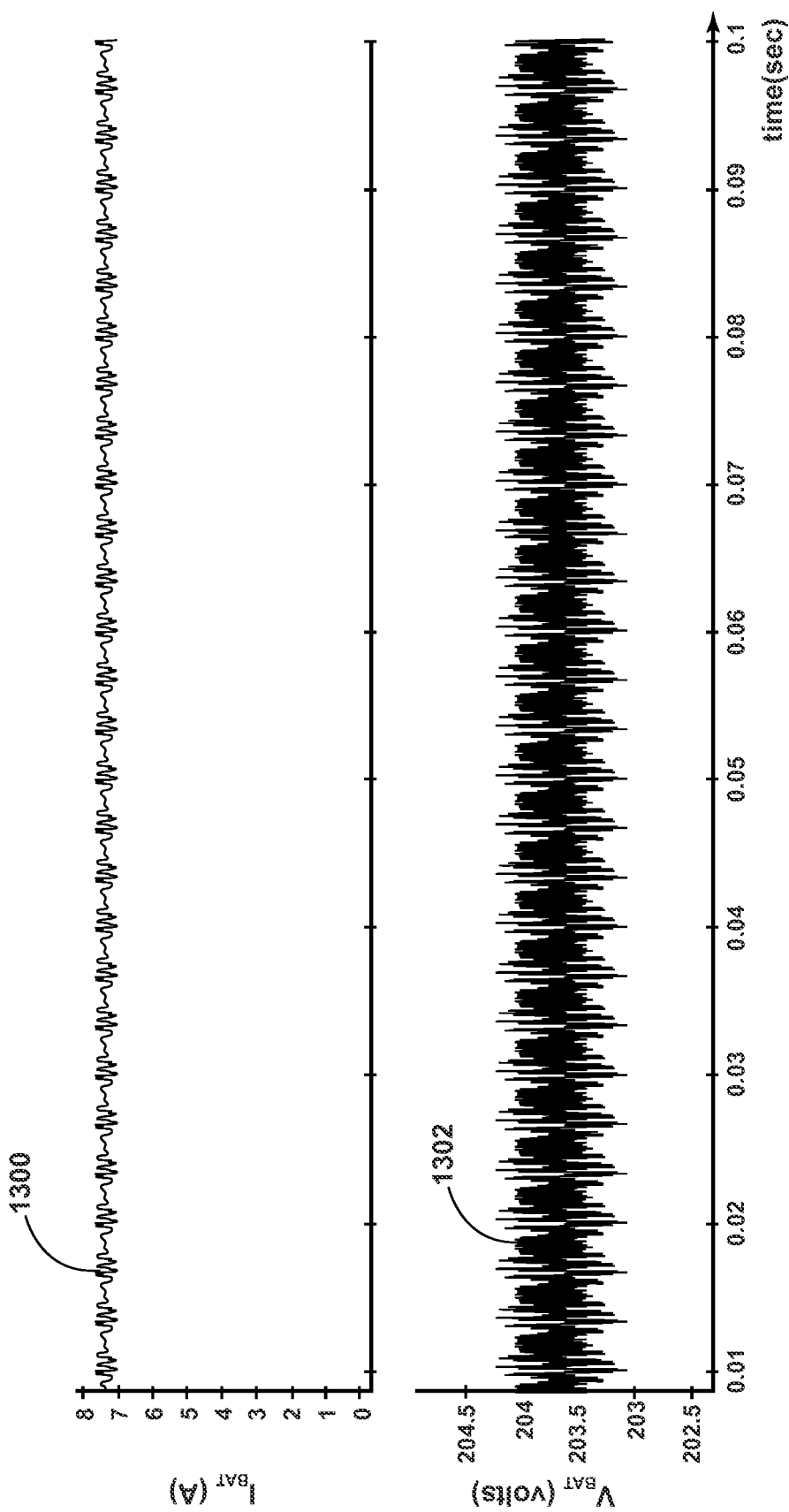
FIG. 13 shows load side (battery) current and voltage output from the embodiment of FIG. 11.

FIG. 13 shows the load side (i.e., battery side in a charger embodiment) current and voltage output as output from multi-phase AC/DC conversion apparatus 1100 of FIG. 11. As can be seen in the uppermost trace in FIG. 13, the battery current (trace 1300) shows a relatively low ripple while the lowermost trace shows that the battery voltage (trace 1302) also exhibits relatively low ripple.

In regard to the parallel and/or multi-phase conversion apparatus 1100, it should be understood that variations are possible. For example, for phases other than 3-phase (i.e., for other phase numbers, such as two), the active filter 72 may still be needed or at least desirable. Additionally, even in the conversion apparatus 1100 of FIG. 11 wherein the phase number is equal to 3 or a multiple of 3, i.e., 3n, an active filter such as filter 72 could still be used to filter any harmonics. While efficiency will not be the primary concern, the addition of an active filter may impact cost and/or space needed, since an active filter needs filter the 120 Hz ripple, which means that the capacitor will usually be relatively large, and in turn decrease the power density.

Conventional battery chargers use a 3-stage design, which typically includes a bulky DC-bus capacitor, which in turn reduces power density and exhibits high system loss thereby resulting in reduced efficiency as well as increasing size and weight and requiring expensive cooling. Conventional 2-stage AC/DC converters (e.g., used as a charger) improve efficiency, but exhibit relatively large battery current ripple, which can be unmanageable in certain circumstances. The instant disclosure presents a single-phase AC/DC conversion apparatus as well as a three-phase conversion apparatus. In an embodiment, the single-phase configuration combines an indirect matrix converter with an active output filter, which realizes simultaneously an increased efficiency (>97%), high power density, and a significantly reduced (i.e., low) output current ripple. In another single-phase embodiment, a true matrix converter is used and the active output filter is maintained. In a three-phase configuration, three separate indirect matrix converters are used (one for each phase) with secondary side H-bridges being paralleled; however, the above-mentioned active output filter may be optionally omitted, which saves cost and increases power density.

It should be understood that an electronic control unit as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

Although only certain embodiments have been described above with a certain degree of particularity, those skilled in the art could make numerous alterations to the disclosed embodiments without departing from the scope of this disclosure. It is intended that all matter contained in the above description or shown in the accompanying drawings shall be interpreted as illustrative only and not limiting.

Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. An electric power conversion apparatus, comprising:
a first, single stage comprising an indirect matrix converter having an input interface configured to receive a first alternating current (AC) signal from an AC power source and an output interface configured to produce a second AC signal, said first AC signal having a first frequency, said indirect matrix converter comprising a rectifier responsive to said first AC signal configured to produce a first direct current (DC) signal, said rectifier including a plurality of rectifier switches responsive to a first set of switch control signals, said indirect matrix converter further comprises a DC to AC converter coupled to said rectifier and configured to convert said first DC signal into said second AC signal and having a plurality of DC to AC switches responsive to a second set of switch control signals;
a transformer having a primary winding and an electrically isolated and magnetically coupled secondary winding;
a coupling inductor coupled in series between said output interface of said indirect matrix converter and said primary winding;
a second stage comprising an H-bridge switching arrangement connected to said secondary winding and configured to produce an output signal on an output node, said output signal having a DC component and at least one AC component wherein said at least one AC component comprises a second harmonic of said first frequency, said H-bridge switching arrangement including a plurality of H-bridge switches responsive to a third set of switch control signals;
said second stage further comprising an active filter coupled to said output node wherein said active filter is disposed on a secondary winding side of said transformer, said active filter being configured to reduce said second harmonic AC component; and
an electronic controller including a processor and a memory, said electronic controller being in communication with said indirect matrix converter and said H-bridge switching arrangement, said electronic controller having main control logic including power factor correction (PFC) logic stored in said memory which, when executed by said processor, is configured to generate said second and third sets of switch control signals to increase a power factor associated with power drawn from said AC source towards one.

2. The apparatus of claim 1 wherein said main control logic when executed by said processor is configured to control operation of said indirect matrix converter and said H-bridge switching arrangement to achieve zero voltage switching (ZVS).

3. The apparatus of claim 2 wherein said plurality of rectifier switches are arranged in a full bridge arrangement; and
wherein said electronic controller includes rectifier logic stored in said memory, said rectifier logic when executed by said processor is configured to generate said first set of switch control signals corresponding to gate drive signals for said plurality of rectifier switches.

4. The apparatus of claim 3 further comprising a grid voltage sensor in sensing relation to said AC power source outputting a grid power signal and configured to generate a grid voltage signal indicate of said grid voltage.

5. The apparatus of claim 4 wherein said rectifier logic is responsive to said grid voltage signal in generating said first set of switch control signals.

6. The apparatus of claim 3 wherein said second AC signal has a second frequency that is greater than said first frequency, wherein said main control logic when executed by said processor of said electronic controller is configured to generate said second set of switch control signals corresponding to gate drive signals for said DC to AC switches.

7. The apparatus of claim 6 wherein said plurality of H-bridge switches are arranged in an H-bridge configuration, said main control logic when executed by said processor of said electronic controller is configured to generate said third set of switch control signals corresponding to gate drive signals for said H-bridge switches.

8. The apparatus of claim 7 wherein said PFC logic is configured to vary a phase difference in gate drive signals associated with respective H-bridge switches.

9. The apparatus of claim 2 wherein said active filter is one selected from the group comprising a boost type active filter, a buck type active filter, and an H-bridge type active filter.

10. The apparatus of claim 9 wherein said active filter comprises said boost type active filter, said boost type active filter comprises:
a filter inductor having a first end and a second end wherein said first end is connected to said output node;
a first filter switch having a first drain connected to said second end of said filter inductor, a first source connected to a ground node, and a first gate;
a filter capacitor having a first end and a second end wherein said second end is connected to said ground node; and
a second filter switch having a second drain connected to said first end of said filter capacitor, a second source connected to said second end of said filter inductor, and a second gate.

11. The apparatus of claim 10 wherein said controller is connected to said first and second gates of said first and second filter switches, said main control logic includes active filter duty cycle control logic which when executed by said processor is configured to generate a fourth set of switch control signals corresponding to gate drive signals for said first and second filter switches, said duty cycle control logic is configured to reduce said second harmonic by selectively activating said first and second filter switches to store and release energy in said filter inductor.

12. The apparatus of claim 1 wherein current through said coupling inductor is bi-directional.

13. The apparatus of claim 1 further comprising an output capacitor coupled between said output node and a ground node.

\* \* \* \* \*